Jan. 16, 1968

P. D. GEORGE 3,363,491

MODULAR LATHES

Original Filed May 15, 1964

INVENTOR.
PETER D. GEORGE

BY Morse, Altman + Oates

ATTORNEYS

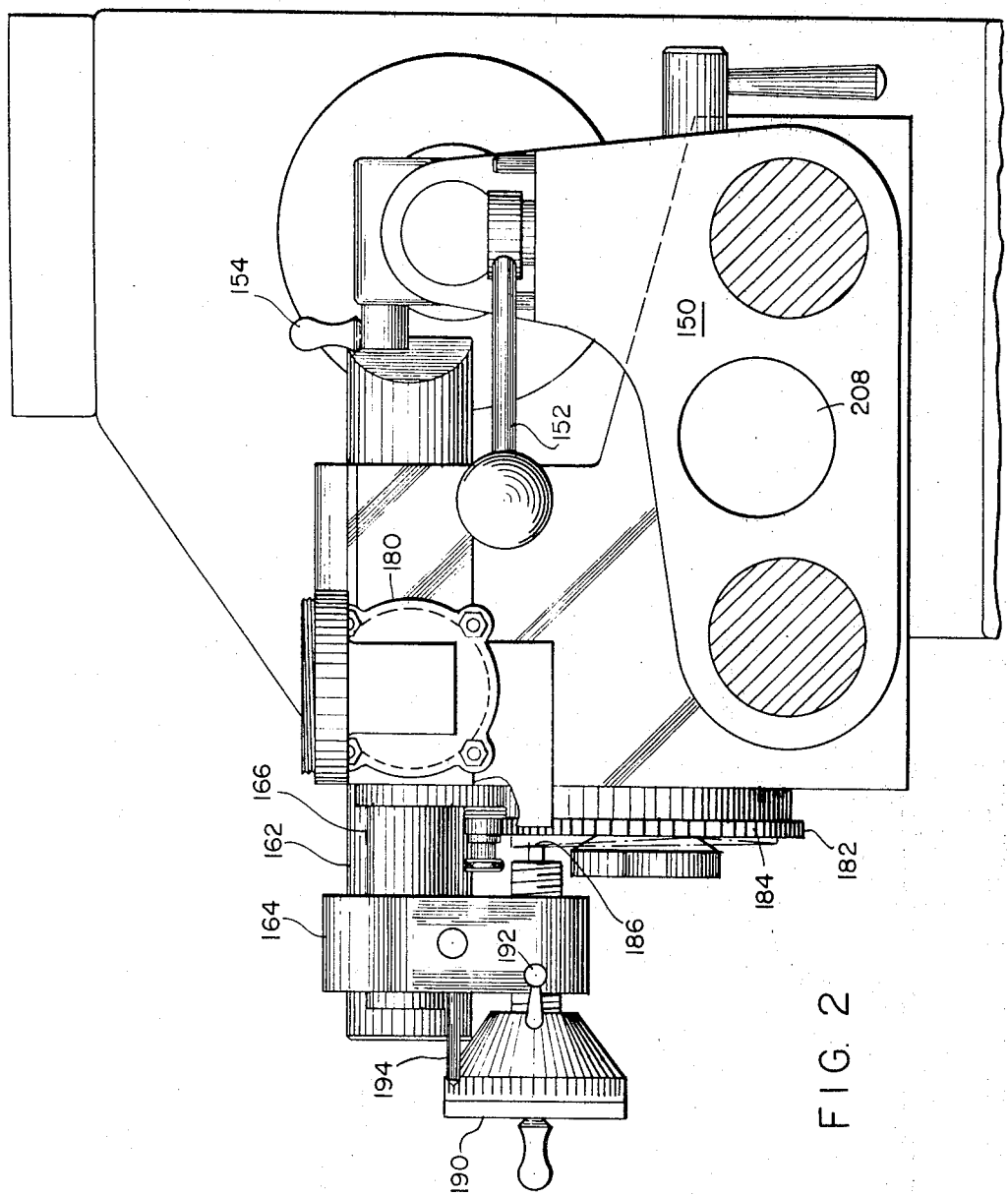

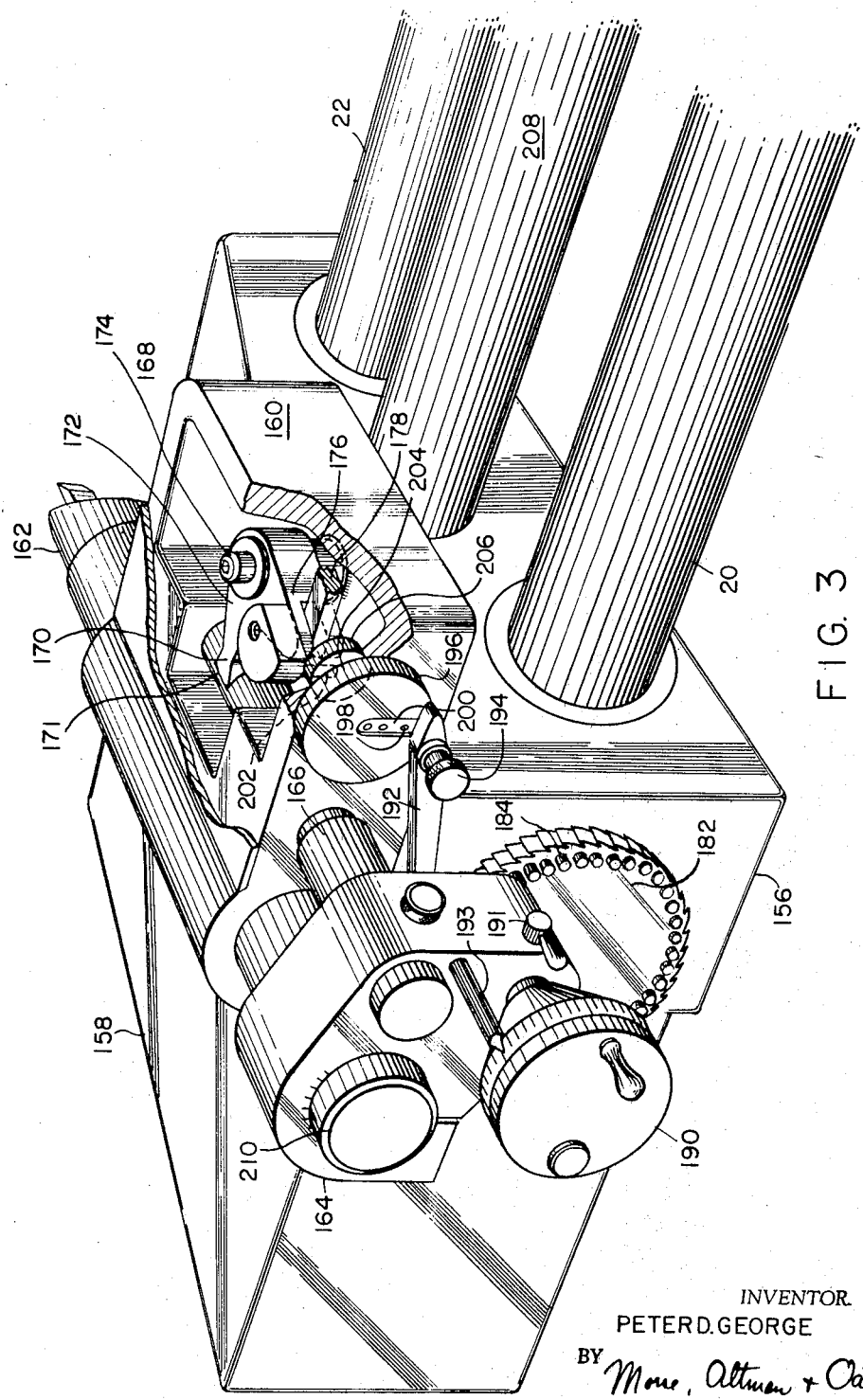

United States Patent Office 3,363,491
Patented Jan. 16, 1968

3,363,491
MODULAR LATHES
Peter D. George, 156 Crabtree Road,
Quincy, Mass. 02169
Original application May 15, 1964, Ser. No. 367,720. Divided and this application Jan. 23, 1967, Ser. No. 611,083
3 Claims. (Cl. 82—5)

ABSTRACT OF THE DISCLOSURE

A thread forming apparatus is provided for lathes whereby progressively deeper cuts may be made automatically on each cycle. Movement of the tool holder is controlled by a reciprocating mechanism which is limited by an array of stops formed about the periphery of an indexing wheel. Each stop is of a different length and the wheel advances on each stroke of the tool to bring another stop into position automatically. A ratchet, pawl and pivoted dog are employed to advance the wheel upon reciprocation of the tool.

---

Figure 1:
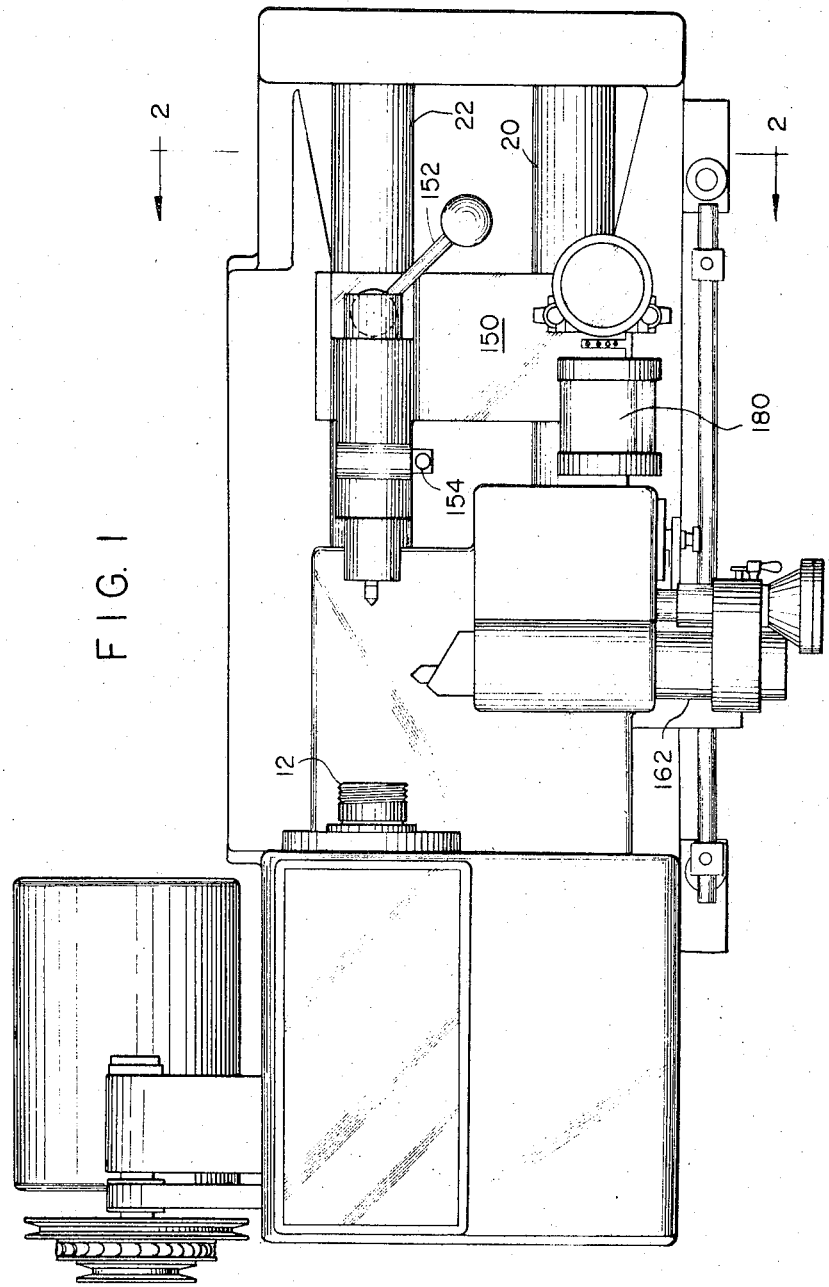

This application is a division of my U.S. application Ser. No. 367,720, filed May 15, 1964.

This invention relates generally to lathe machinery and more particularly is directed towards a lathe base support and driving head in cooperation with a variety of interchangeable modules adapted to perform selected machining operations. This invention is also directed towards improvements in lathe components.

A lathe generically defines a machine adapted to remove metal from a workpiece by gripping it securely in a clamping device and rotating it under power against a suitable cutting tool. Lathes are able to perform a number of machining operations such as facing, boring and threading, and, depending upon the design of the machine, these operations may be carried out under manual, semi-automatic or completely automatic control. While machines of this type generally are quite versatile as a class, a specific lathe unit is relatively restricted as to its range of operations. For this reason, machine shops normally require several individual lathe machines, each adapted to perform certain machining operations for which each machine is particularly designed. Since each machine is a relatively expensive piece of equipment, a sizable capital outlay is required to properly outfit a machine shop.

Accordingly, it is a general object of the present invention to provide improvements in lathe machines.

Another object of this invention is to provide a basic lathe unit adapted to accommodate a variety of interchangeable modules for performing a variety of different machining operations.

Still another object of this invention is to provide a lathe machine which is readily convertible from one mode of operation to another.

A still further object of this invention is to provide a lathe machine with cooperating modules which may function on a manual, semi-automatic or completely automatic basis.

More particularly, this invention features a lathe comprising a basic driving head and cylindrical ways of hardened metal on which are selectively mounted interchangeable modules each adapted to perform one or more selected operations such as threading, boring, or the like. Certain ones of the modules may be programmed to cycle automatically and perform selected predetermined operations on a completely automatic basis. Other modules may be employed for semi-automatic operation while further modules may be operated manually for use in producing individual parts not suitable for automatic production.

However, these and other features of the invention, along with further objects and advantages thereof, will become more fully apparent from the following detailed description of a preferred embodiment of the invention, with reference being made to the accompanying drawings in which:

FIG. 1 is a top plan view of a threading machine module mounted on a lathe base, FIG. 2 is a cross-sectional view taken along the line 2—2 of FIG. 1, FIG. 3 is a view in perspective of the threading machine actuating mechanism of FIG. 1 with portions broken away to show details of construction.

Referring now to FIGS. 1, 2 and 3, there is illustrated a threading machine module assembled on a lathe base. This threading module includes a tail stock 150 mounted on ways 20 and 22 and inclueds a conventional tail stock advance 152 and lock 154. The main portion of the threading machine is organized about a carriage 156 mounted on the ways 20 and 22. The carriage 156 is formed with a generally wedged shaped baffle section 158 which conforms to the configuration of an opening 18 in the drive housing.

The function of the baffle section 158 is to direct the flow of chips and coolants rearwardly and away from the operating mechanism. Mounted on the top portion of the carriage is a block 160 which slideably supports a cylindrical tool holder 162 disposed right angularly with respect to the ways 20 and 22 and adapted to be reciprocated into and out of cutting engagement with a workpiece rotatably mounted between the tail stock and the spindle.

The tool holder 162 at its outer end engages the bracket 164 which is mounted fast to a connecting rod 166 extending in spaced parallel relation to the tool holder 162 and also slideably mounted through the block 160. The block 160 as best shown in the cutaway view of FIG. 3 is formed with a chamber 168 through which extends a portion of the rod 166. This rod is formed with a notched portion 170 to receive one leg 171 of a dog 172 pivoted about a vertical pin 174. The dog 172 is also formed with another leg 176 drivingly connected by a push rod 178 to a pneumatic or hydraulic power cylinder 180 shown in FIG. 1. It will be understood that whenever the power cylinder 180 is actuated the push rod 178 will pivot the dog 172 thereby reciprocating the rod 166 which in turn will reciprocate the tool holder 162.

Associated also with the reciprocation of the tool holder 162 is a control mechanism for making cuts of graduated depth. This control mechanism is organized generally about a ratchet wheel 182 faced with a plurality of stepped bosses 184 arranged concentrically about the outer margin of the wheel 182. The bosses are graduated in the length about the wheel and may be indexed into register with an adjustable stop 186. This stop is the inner end of a screw 188 threaded through the bracket 164 and rotated by means of a dial handle 190 which may be locked in a selected position by means of a set screw 191. The outer periphery of the handle 190 is calibrated for reading against a pointer 193 extending from the face of the bracket 164. It will be understood that as the tool holder 162 is reciprocated back and forth the depth of the cut will be controlled by the stop 186 as it comes against one of the bosses 184 during a cutting stroke. The mechanism is arranged so that the wheel 182 indexes either in single or multiple increments each time the tool holder is reciprocated so that each cutting stroke will advance to a greater depth than the preceding cutting stroke.

The mechanism for advancing or indexing the ratchet wheel includes a pawl 192 pivoted about a pin 194 carried by a rotor 196. The pin may be selectively mounted in any one of a plurality of radially spaced holes 198 formed in the rotor at the base of a radial groove 200. The rotor is adapted to be rotated each time the dog 172 is biased whereby the pawl will be advanced to index the ratchet wheel. It will be understood that the further out the pawl is mounted along the rotor the greater will be the increment of advance of the ratchet wheel whereas if the pawl is mounted in one of the innermost holes 198 of the rotor, the ratchet wheel will be advanced only in single or double increments.

The rotor actuating mechanism includes vertical pin 202 depending from the arm 176 of the dog 172 and in the path of a horizontally extending pin 204 mounted to a disc 206 which is rotatable with the rotor 196. Thus, each time the pin 202 is moved against the pin 204 under the action of the push rod 178, the rotor will be rotated and the ratchet wheel will be indexed.

The longitudinal movement of the entire carriage 156 along the ways 20 and 22 is controlled by means of a lead screw 208 extending parallel between the ways and in driving engagement with the carriage. Thus, as the machine is cycled, the carriage will reciprocate back and forth along the ways and the tool holder will reciprocate in and out against the workpiece with the cutting depth being increased over each preceding cut until the entire work is finished at which point the depth control will be recycled.

It will be noted that the tool holder may be rotated about its longitudinal axis in order to produce a selected helix angle on the work. A suitable dial 210 is provided for this purpose.

While the invention has been described with particular reference to the illustrated embodiments, it will be understood that numerous modifications thereto will appear to those skilled in the art. Also, it will be understood that the above description and accompanying drawings should be taken as illustrative of the invention and not in a limiting sense.

Having thus described the invention, what I claim and desire to obtain by Letters Patent of the United States is:

1. A thread forming apparatus for a lathe, comprising
   (a) a support mountable on said lathe,
   (b) a tool holding rod slidably mounted to said support,
   (c) power means engaging said rod for axial reciprocation thereof,
   (d) a wheel rotatably mounted to said support about an axis parallel to said rod,
   (e) a plurality of stops disposed about said wheel,
   (f) said stops being of different effective lengths,
   (g) another stop mounted to said rod and in line with said wheel, and,
   (h) means responsive to reciprocation of said rod for indexing said wheel and thereby move successive wheel stops into register with said rod stop for changing the cutting strokes of said rod,
   (i) said indexing means including a rotor drivingly connected to said power means and rotatable upon each actuation of said power means,
   (j) a pawl mounted to said rotor and extending into engagement with said wheel, said wheel being formed with cooperating ratchet teeth for indexing said wheel upon rotation of said rotor.

2. A thread forming apparatus according to claim 1 including a pivoted dog drivingly engaging said rod, said power means and said rotor, whereby actuation of said power means will pivot said dog to reciprocate said rod and rotate said rotor.

3. A thread forming attachment according to claim 1 including adjusting means connecting said pawl to said rotor for selectively positiong said pawl along a radius of said rotor to thereby selectively increase or decrease the movement of said pawl upon rotation of said rotor.

References Cited

UNITED STATES PATENTS

| 230,629   | 8/1880 | Grant          | 82—5 |
| 796,171   | 8/1905 | Ambrose        | 82—5 |
| 2,903,933 | 9/1959 | Mackenzie      | 82—5 |
| 3,121,357 | 2/1964 | Skoglund et al.| 82—5 |

LEONIDAS VLACHOS, *Primary Examiner.*